United States Patent
He et al.

(10) Patent No.: US 11,349,655 B2
(45) Date of Patent: May 31, 2022

(54) SYSTEM AND METHOD FOR A DISTRIBUTED KEYSTORE

(71) Applicant: ORACLE INTERNATIONAL CORPORATION, Redwood Shores, CA (US)

(72) Inventors: Chen He, Redwood City, CA (US); Satish Panchumarthy, Redwood City, CA (US); Geoffrey Stewart, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 433 days.

(21) Appl. No.: 16/370,304

(22) Filed: Mar. 29, 2019

(65) Prior Publication Data
US 2020/0112433 A1    Apr. 9, 2020

Related U.S. Application Data

(60) Provisional application No. 62/748,994, filed on Oct. 22, 2018, provisional application No. 62/748,020, filed on Oct. 19, 2018, provisional application No. 62/741,737, filed on Oct. 5, 2018.

(51) Int. Cl.
*H04L 9/08* (2006.01)
*G06F 21/60* (2013.01)

(52) U.S. Cl.
CPC .......... *H04L 9/0894* (2013.01); *G06F 21/602* (2013.01)

(58) Field of Classification Search
CPC ............................ H04L 9/0894; G06F 21/602

USPC ......................................................... 380/279
See application file for complete search history.

(56) References Cited

U.S. PATENT DOCUMENTS

| | | | |
|---|---|---|---|
| 10,445,184 B1* | 10/2019 | Hallak | G06F 3/0619 |
| 10,740,366 B2* | 8/2020 | Mohassel | G06F 12/1408 |
| 2008/0123855 A1* | 5/2008 | Thomas | H04L 9/0894 380/277 |
| 2009/0046862 A1* | 2/2009 | Ito | H04L 9/088 380/277 |
| 2017/0272209 A1* | 9/2017 | Yanovsky | H03M 13/13 |
| 2018/0157860 A1* | 6/2018 | Nair | G06F 9/45558 |

OTHER PUBLICATIONS

NPL Search Terms (Year: 2021).*
Ching, Avery, et al. "One trillion edges: Graph processing at facebook-scale." Proceedings of the VLDB Endowment 8.12 (2015): 1804-1815 (Year: 2015).*
NPL Search Terms (Year: 2022).*
G. Wu, Y. Zhang, D. Wang, S. Wang and M. Chen, "The data reliability techniques in BC-KVDB," 2012 IEEE 2nd International Conference on Cloud Computing and Intelligence Systems, 2012, pp. 471-475 (Year: 2012).*

(Continued)

*Primary Examiner* — Syed A Zaidi
(74) *Attorney, Agent, or Firm* — Tucker Ellis LLP

(57) ABSTRACT

Described herein are systems and methods for a distributed Java Keystore, in accordance with an embodiment. This KeyStore can provide a secure place for a distributed queue to persist credentials, private keys, and other sensitive information. Such a KeyStore can be utilized within other distributed systems that require scaling (in and out) in runtime.

14 Claims, 9 Drawing Sheets

(56) References Cited

OTHER PUBLICATIONS

Apache Kafka, "A distributed streaming platform" Documentation Kafka 2.3 Documentation, © 2017 Apache Software Foundation, 490 pages, retrieved on Oct. 4, 2019 from: <https://kafka.apache.org/documentation/>.

Apache, "ZooKeeper: Because Coordinating Distributed Systems is a Zoo", ZooKeeper 3.5 Documentation, © 2017 Apache Software Foundation, 1504 pages, retrieved on Oct. 4, 2019 from: <https://zookeeper.apache.org/doc/current/>.

Oracle, "Java™ Platform Standard Ed. 7, Class KeyStore", Copyright © 1993, 2018, 15 pages, retrieved on Oct. 4, 2019 from: <https://docs.oracle.com/javase/7/docs/api/java/security/KeyStore>.

* cited by examiner

SYSTEM AND METHOD FOR A DISTRIBUTED KEYSTORE

CLAIM OF PRIORITY

This application claims the benefit of priority to U.S. Provisional Patent Application entitled "SYSTEM AND METHOD FOR A DISTRIBUTED KEYSTORE", Application No. 62/748,994, filed on Oct. 22, 2018, U.S. Provisional Patent Application entitled "SYSTEM AND METHOD FOR A DISTRIBUTED KEYSTORE", Application No. 62/748,020, filed on Oct. 19, 2018, and to U.S. Provisional Patent Application entitled "SYSTEM AND METHOD FOR DISTRIBUTED KEYSTORE", Application No. 62/741,737, filed on Oct. 5, 2018, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This disclosure relates generally to systems and methods for a distributed keystore. More particularly, the disclosure relates to systems and methods for a distributed keystore in a streaming data platform.

BACKGROUND

Managed streaming data platforms and distributed queues (such as Oracle Event Hub) can leverage the combined power of cloud services with other services, such as Kafka, to enable users to work with streaming data. Users are able to quickly create, configure and manage topics in the cloud while a back end manages the underlying platform.

Massive amounts of data are generated every minute by various modern organizations. A significant challenge to processing incoming data is the very high frequency at which they are generated. This makes it hard to consume and process these data. Streaming data platforms enables users to meet this challenge.

Such streaming data platforms can perform various tasks, such as acting as a message broker for transfer of data between various systems, enabling users to produce and consume messages, and enabling users to access data.

SUMMARY

Described herein are systems and methods for a distributed keystore, in accordance with an embodiment. In accordance with an embodiment, a distributed keystore can be provided on top of on top of a centralized synchronization service (e.g., ZooKeeper, which is a centralized service for distributed systems to a hierarchical key-value store, which is used to provide a distributed configuration service, synchronization service, and naming registry for distributed systems), for a managed streaming data platforms and distributed queues (e.g., Oracle Event Hub). Such a distributed keystore can provide a secure place for persistence of credentials, private keys, and other sensitive information.

Figure 1:
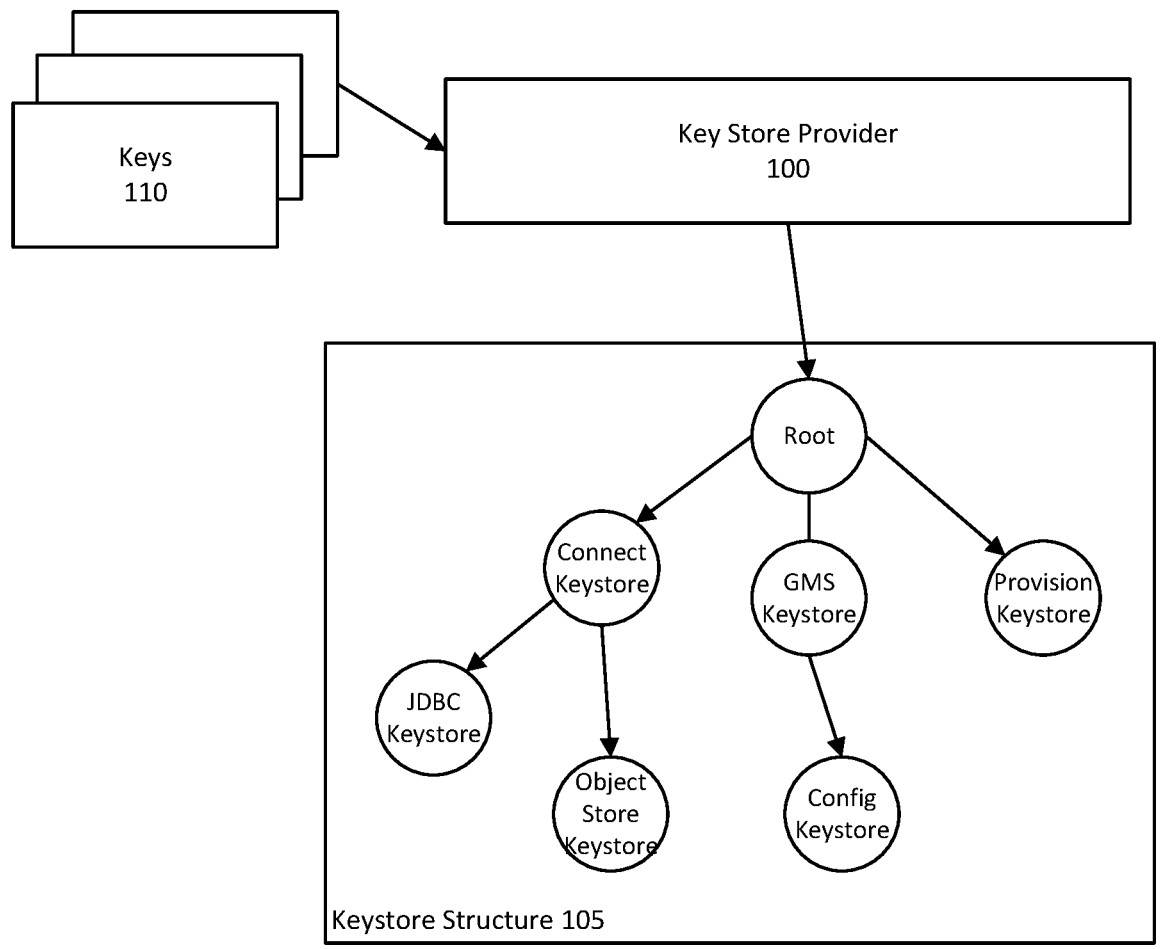
FIG. 1 shows a system for a distributed keystore, in accordance with an embodiment.

DETAILED DESCRIPTION:

In accordance with an embodiment, the following descriptions of embodiments of the present disclosure are discussed in terms of certain products. For example, a managed streaming data platform and distributed queue can be referred to herein as Oracle Event Hub. As well, a centralized synchronization service can be referred to as ZooKeeper. This is for illustrative purposes only. It will be apparent to persons skilled in the relevant art that various additions, subtractions, deletions, variations, substitutions of elements with equivalents, and other modifications and changes in form, detail, implementation and application can be made herein without departing from the spirit and scope of the invention.

In distributed cloud environment, username and password are sensitive. It is common that cloud services need to preserve such sensitive information, especially in big data clouds which include many distributed software solutions (e.g., Hadoop, Event Hub, Hive, HBase, Openstack, etc.). Such solutions and programs need to work together as an ecosystem. This can be hampered when each system has its own authentication mechanism and can require different credentials from users.

In accordance with an embodiment, within a distributed queue, users can push data into the queue with the desire that it eventually get pushed into other distributed systems (e.g., object store or database). However, each of these other distributed systems, in addition to the distributed queue itself, can require user different credentials and/or authentication data.

In accordance with an embodiment, however, there is, in general, no secure method for these systems to preserve sensitive information in a secure manner. It is even the case that some solutions save sensitive in distributed file systems in unencrypted plain text.

In accordance with an embodiment, described herein is a distributed keystore that can be utilized by a managed streaming data platform and distributed queue. This distributed keystore can provide a secure place for the managed streaming data platform and distributed queue to persist credentials, private keys, and other sensitive information.

Such a keystore can be utilized within other distributed systems that require scaling (in and out) in runtime as well.

Currently, most of the industry solutions are using distributed file systems as storage for preserving keystores. This requires at least one distributed file system to be installed. However, maintaining distributed file systems is hard and costly, especially for those services that do not have distributed file systems. To preserve sensitive information in a distributed manner becomes hard. The present disclosure provides an improvement to current systems in as much that it does not require a distributed file system. It instead can utilize light weight services, such as a centralized synchronization service (e.g., ZooKeeper), as a library and can scale flexibly to thousands of servers without performance degradation. Such a system and method provides a fast access mechanism that has a configurable asynchronous updater. As well, an asynchronous updater can be provided so that users do not need to wait for HTTP requests to access the keystore in a distributed environment.

In accordance with an embodiment, a distributed keystore can comprise a number of features. Such features include password protection. This allows users to use a password to encrypt the keystore. Access to the keystore can be rejected if password is incorrect, which provides secure access. In addition, another feature can be a distributed keystore. This can allow a user to access keystore from different servers. This provides flexibility for cluster scale out and scale in. Distributed keystores also provide fast access. This is due to an asynchronous configurable keystore updater. Because of this, the systems and methods can request and update keystore instance in memory in parallel. In this way, any requests to the keystore do not need a remote HTTP request since the updater has already performed this step. Distributed keystores are also light-weight. The system does not require any distributed file system support. Distributed keystores files are encrypted. Finally, the distributed keystores are scalable. The keystore can scale to thousands of servers as long as the provider keystore is available. As well, the access time still remains the same.

FIG. 1 shows a system for a distributed keystore, in accordance with an embodiment.

In accordance with an embodiment, a keystore provider 100, such as ZooKeeper Java KeyStore provider, can create a keystore structure 105, within which the keystore can be saved in a tree-structure on a number of nodes (examples of nodes are labeled in the Figure as root, connect keystore, GMS keystore, provision keystore, JDBC keystore, object keystore, and config keystore).

In accordance with an embodiment, they system and methods can and save the keystore structure using an encoding mechanism on a plurality of nodes 105. The keystore provider can provide basic functions, such as create, get, and delete a key/value pair in the keystore. Users can give an alias as name for credential saved in the keystore as unique identifier.

In accordance with an embodiment, once a user inputs credentials for a distributed systems that accesses/utilizes the managed streaming data platform and distributed queue, such credentials are automatically encrypted before being stored at the nodes.

In accordance with an embodiment, the keystore provider 100 can provide a synchronization service that operate as a tree structure. For every node on the tree, the system can create a sub tree under the root tree. In the case of some keystore providers, such as ZooKeeper, each node is only allowed to see/access a relatively small node size, such as 1 megabyte. Because of such size limitations, the system can use a first node as metadata store used for mapping of the remainder of the tree structure, and then the sub nodes can scale. When a tree becomes too large for a single root metadata store node, the systems and methods can provision a secondary, tertiary, or a larger number of root nodes with metadata stores that map the entire tree structure.

In accordance with an embodiment, when a user inputs a key 110 (e.g., ACLs (access control lists), Credentials, Private Keys . . . etc.), the keystore provider 100 automatically encrypts the credentials (e.g., via Oracle JceKeyStore) and places the key within the tree structure, where the first node (and potentially one or more levels of node below the first node) is utilized for metadata (e.g., a mapping). Then, the credential is stored at a service keystore level (e.g., Connect KeyStore, JDBC KeyStore, Object Store KeyStore, GMS KeyStore, Config KeyStore, Provision KeyStore). As shown in the Figure, each of the services associated with a keystore is a service that accesses and/or uses a managed platform and distributed queue.

In accordance with an embodiment, because the tree is scalable, the tree that stores the encrypted keys is likewise scalable. Any given node can, for example, store credentials for a group of users, or one user, or a group of services, or one service.

Figure 2:
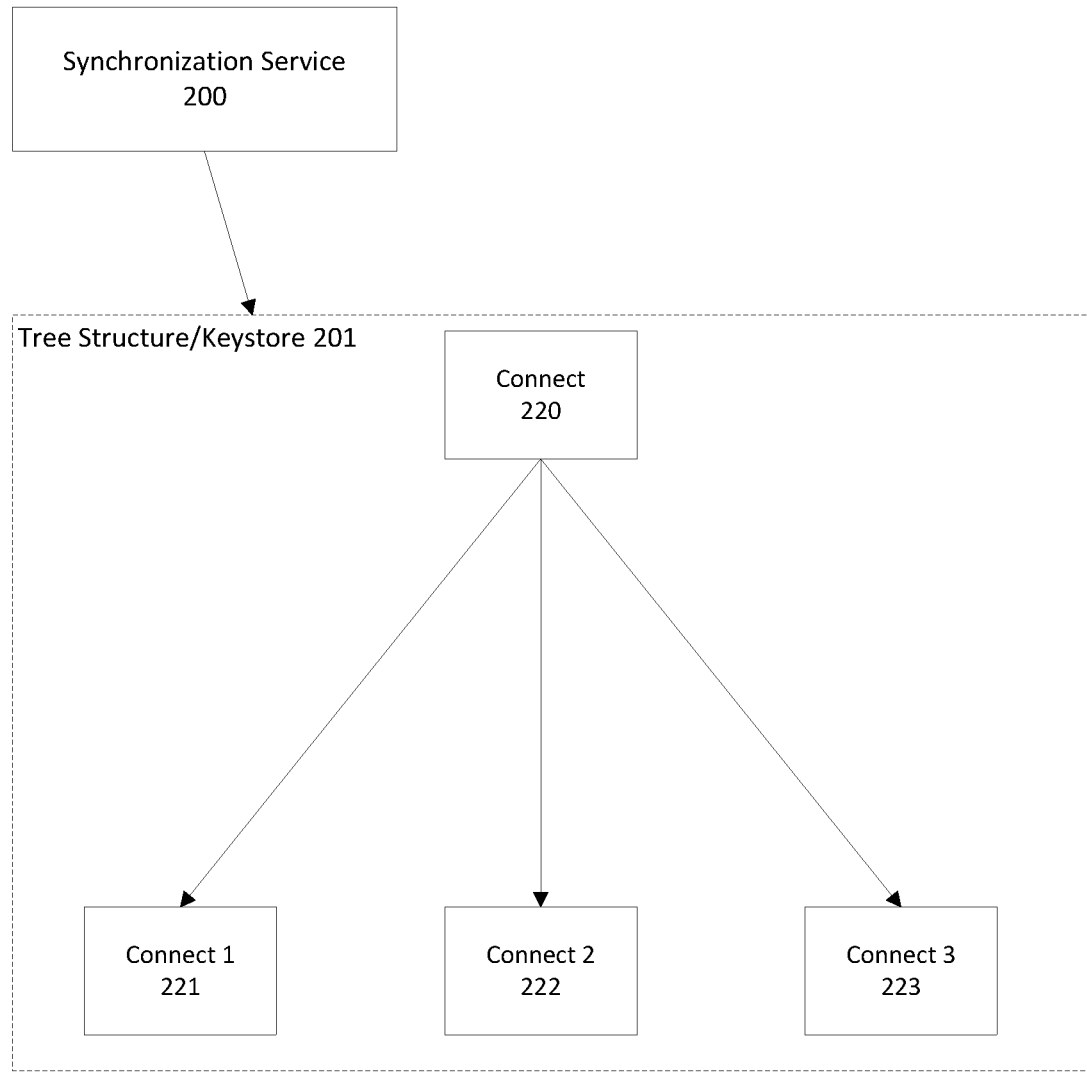
FIG. 2 shows a broken out tree structure for a single-tenant environment, in accordance with an embodiment.

FIG. 2 shows a broken out tree structure for a single-tenant environment, in accordance with an embodiment.

In accordance with an embodiment, a centralized synchronization service 200 (e.g., ZooKeeper) can create and manage tree structure/keystore 201 that can be provided for a single tenant environment.

In accordance with an embodiment, the connect node 220 can serve as a connect service (e.g., Kafka). In the beginning, the connect node will save the secret (e.g., credentials) directly. Once it reaches a size limit of the node capacity, the centralized synchronization service can shift secrets/credentials to a child node (called connect 1 221, connect 2 222, connect 3 223). Once the secrets/credentials have been shifted from the connect node 120, the connect node is then used for metadata only. Once more secrets/credentials come into the system to be stored, the centralized synchronization service increases (creates additional) child node numbers, save metadata into connect node, and scales horizontally.

As more secrets/credentials are stored within the tree-structure, new nodes can be added as needed (e.g., when a given node is 75% full, a command can be automatically called to create a new node for storage of additional credentials). As well, although only shown in two levels of nodes, the methods and systems herein can comprise more or fewer levels of nodes.

In accordance with an embodiment, the top level node (e.g., the connect node) can comprise metadata, such as, including but not limited to:

Total Capacity: A total number of nodes that are allowed to be created

Used Capacity: A number of created nodes within a sub structure

Child left: a left child node path

Child right: a right child node path

In accordance with an embodiment the children nodes (e.g., nodes connect 1, connect 2, connect 3), can comprise metadata and data, including but not limited to:

Metadata

Left path: the child left path

Right path: the child right path isFull: an indication of whether the node data is almost full (e.g., at 75% capacity)

Data

Hash map of key/value (also referred to as "k/v") pairs.

In accordance with an embodiment, when a user creates a KeyObject object, a user can specify the path and storage size. As an example: ZookeeperJavaKeyStoreProvider zk=new ZookeeperJavaKeyStoreProvider("/connect", 128)

In accordance with an embodiment, the above example provides an instruction to create a key store tree structure which has "/connect" as the primary top node and 128 child nodes. Multiple distinct top nodes may exist and be used concurrently. Other examples of top nodes could be /restApplication or /ksql.

In accordance with an embodiment, systems and methods can also provide for scaling a current tree structure. An example command could be: ZookeeperJavaKeyStoreProvider.extendCapacity(128)

In accordance with an embodiment, the above command could enlarges a top node's total capacity by adding another 128 nodes. If the top node is not able to extend capacity, an exception can be raised which will be thrown. This can initiate the creation of a new secondary top node which will be used for further key/value writes. The systems and methods can maintain a list of related top nodes to facilitate all reads and future writes.

Figure 3:
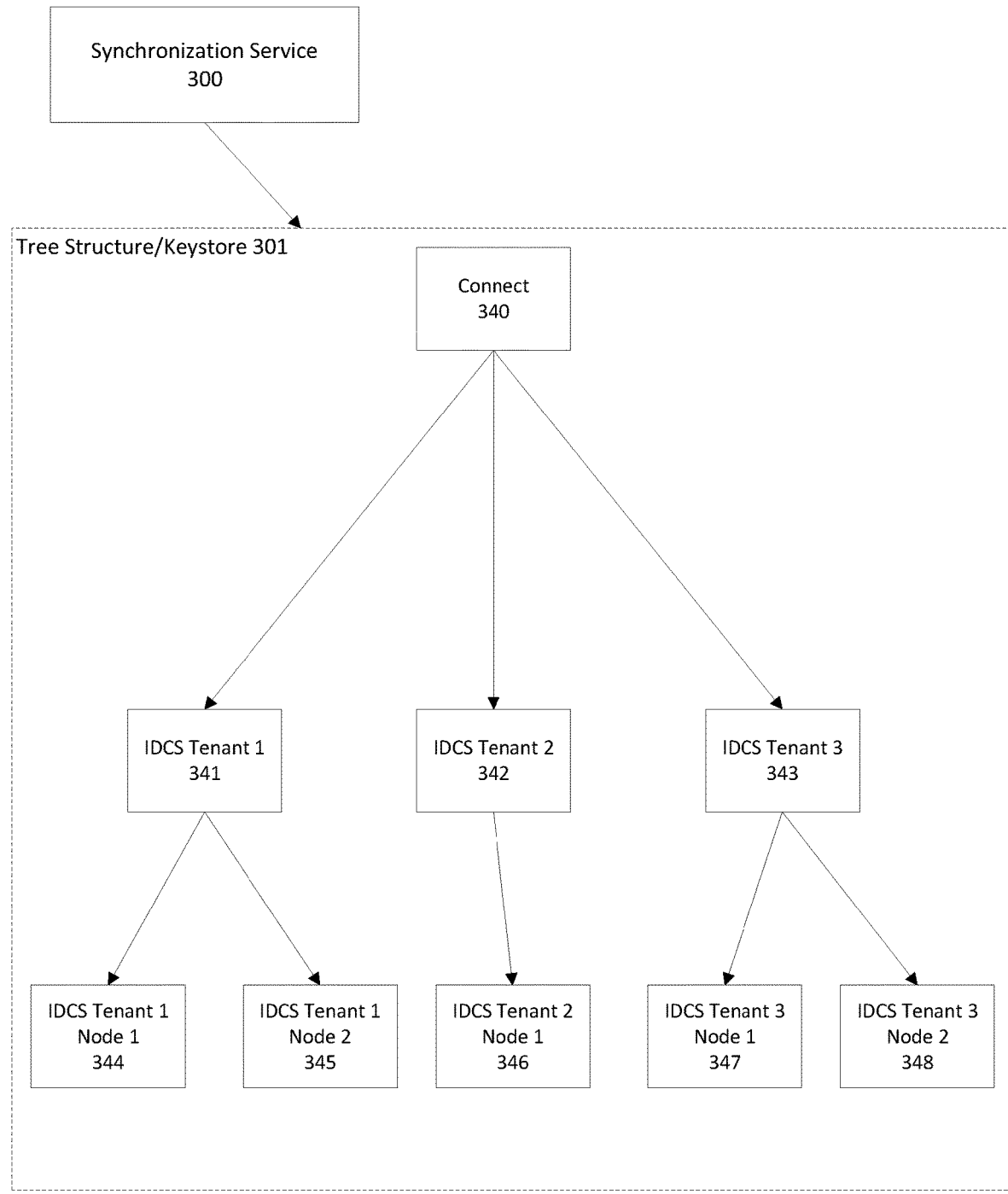
FIG. 3 shows a broken out tree structure for a multi-tenant environment, in accordance with an embodiment.

FIG. 3 shows a broken out tree structure for a multi-tenant environment, in accordance with an embodiment.

In accordance with an embodiment, a centralized synchronization service 300 (e.g., ZooKeeper) can create and manage tree structure/keystore 301 that can be provided for a multi-tenant environment.

In accordance with an embodiment, the connect node 340 can serve as a connect service (e.g., Kafka), holding metadata for which tenant belongs to which child node. For a given child, it repeats the process for the single tenant case. That is, the connect node stores a metadata mapping of each tenant, supported at a first (and others if necessary) level of nodes, e.g., 341, 342, 343. Then, the connect node can track which child node belongs to which tenant node, that is node 344 and 345 belong to node 341, node 346 belongs to node 342, and nodes 347 and 348 belong to node 343.

In accordance with an embodiment, as more secrets/credentials are stored within the tree-structure, new nodes can be added as needed (e.g., when a given node is 75% full, create a new node for storage of additional credentials). As well, although only shown in three levels of nodes, the methods and systems herein can comprise more or fewer levels of nodes.

In accordance with an embodiment, the top level node (e.g., the connect node) can comprise metadata, such as, including but not limited to:

Total Capacity: A total number of nodes that are allowed to be created

Used Capacity: A number of created nodes within a sub structure

Child left: a left child node path

Child right: a right child node path

In accordance with an embodiment the children nodes (e.g., nodes IDCS tenant 1, IDCS tenant 1 nodes 1 and 2, IDCS tenant 2, IDCS tenant 2 node 1, IDCS tenant 3, and IDCS tenant 3 nodes 1 and 2), can comprise metadata and data, including but not limited to:

Metadata

Left path: the child left path

Right path: the child right path isFull: an indication of whether the node data is almost full (e.g., at 75% capacity)

Data

Hash map of key/value (also referred to as "k/v") pairs.

In accordance with an embodiment, when a user creates a KeyObject object, a user can specify the path and storage size. As an example: ZookeeperJavaKeyStoreProvider zk=new ZookeeperJavaKeyStoreProvider("/connect", 128)

In accordance with an embodiment, the above example provides an instruction to create a key store tree structure which has "/connect" as the primary top node and 128 child nodes. Multiple distinct top nodes may exist and be used concurrently. Other examples of top nodes could be /restApplication or /ksql.

In accordance with an embodiment, systems and methods can also provide for scaling a current tree structure. An example command could be: ZookeeperJavaKeyStoreProvider.extendCapacity(128)

In accordance with an embodiment, the above command could enlarges a top node's total capacity by adding another 128 nodes. If the top node is not able to extend capacity, an exception can be raised which will be thrown. This can initiate the creation of a new secondary top node which will be used for further key/value writes. The systems and methods can maintain a list of related top nodes to facilitate all reads and future writes.

Figure 4:
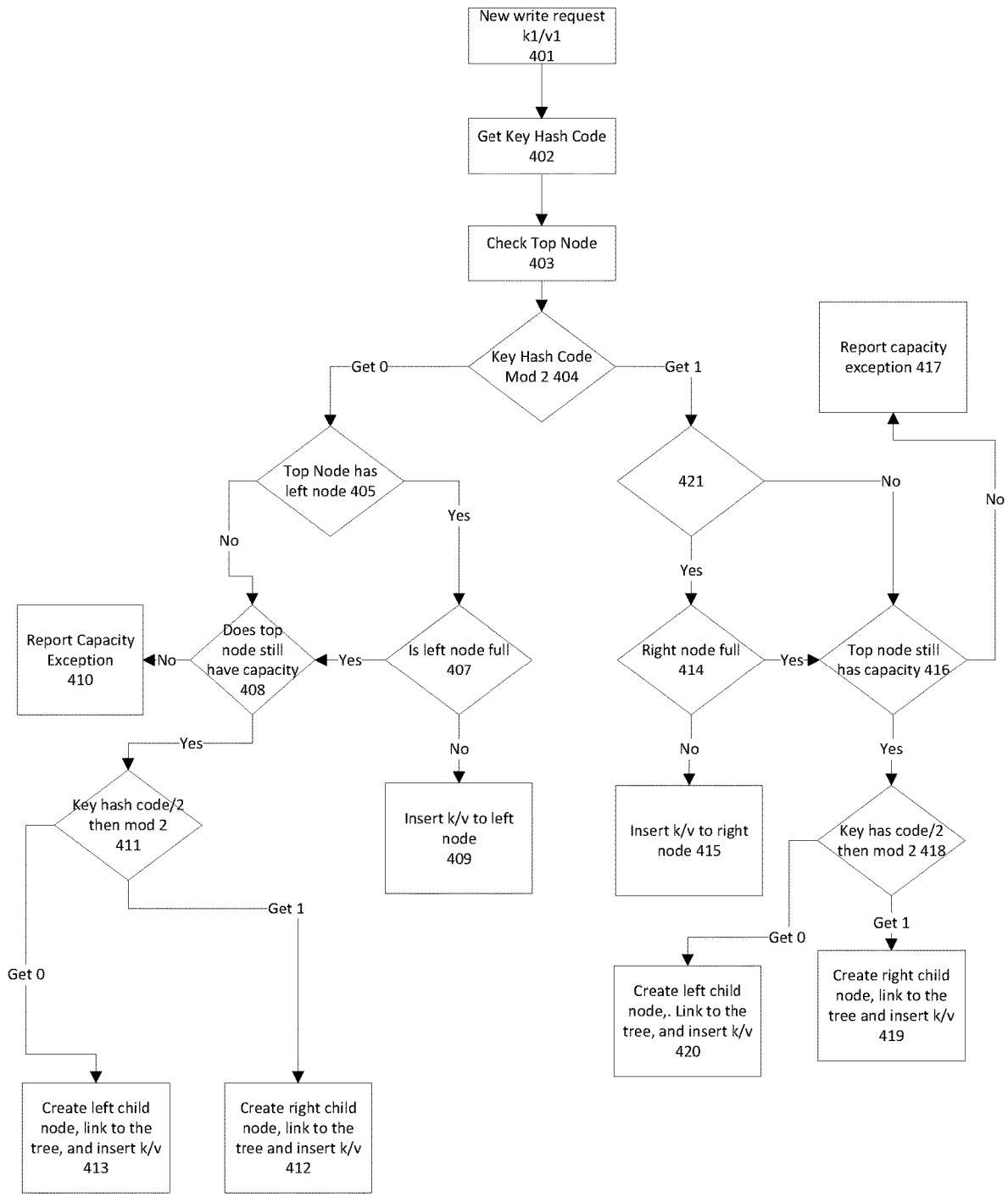
FIG. 4 shows a flowchart for writing a key value pair into a tree structure of nodes, in accordance with an embodiment.

FIG. 4 shows a flowchart for writing a key value pair into a tree structure of nodes, in accordance with an embodiment.

In accordance with an embodiment, the flowchart provided in FIG. 4 shows method for a distributed keystore.

In accordance with an embodiment, at 401, when there is a new key/value coming, the system and methods can first do a hash 402 of the key to get a numerical number (N1). Then, the system and method can check the top node 403 and do a mod 2 404 of N1. If it returns 0 (if return 1, it is similar but goes to right subtree), the system and method can go to the left subtree and check whether top node has left node or not 405. If so, the system and method can check if current node is full or not 407. If not, the system and method can insert the key/value to this node 409. If current node is full, the system and method can check if the nodes has reached total capacity or not 408. If so, the system and method can return exception 410. If not, the system and method can to do a (N1/2) mod 2 411 since this is a lower level tree structure, the system and method can (attempt to) keep every node balanced and try to avoid collision. If return 1, the system and method can create a right child, link it to the tree, then insert the key/value 412. Similarly, if the system and method return 0, a left child can be created, link it to the tree, then insert the key/value 413.

In accordance with an embodiment, if the key hash code mod 2 404 returns a 1, the system and method can go to the right subtree and check whether top node has right node or not 421. If so, the system and method can check if current node is full or not 414. If not, the system and method can insert the key/value to this node 415. If current node is full, the system and method can check if the nodes has reached total capacity or not 416. If so, the system and method can return exception 417. If not, the system and method can to do a (N1/2) mod 2 418 since this is a lower level tree structure, the system and method can (attempt to) keep every node balanced and try to avoid collision. If return 1, the system and method can create a right child, link it to the tree, then insert the key/value 419. Similarly, if the system and method return 0, a left child can be created, link it to the tree, then insert the key/value 420.

In accordance with an embodiment, in the cases when the exception was encountered, a new secondary top node can be created which can be used for further key/value writes. The system and method can maintain a list of related top nodes to facilitate all reads and writes. A reference to the current writable top node can be available. The name of a secondary top node can be derived from the corresponding top node. This can enable system and method to establish all related top nodes during initialization, and determine the current writable top node.

Figure 5:
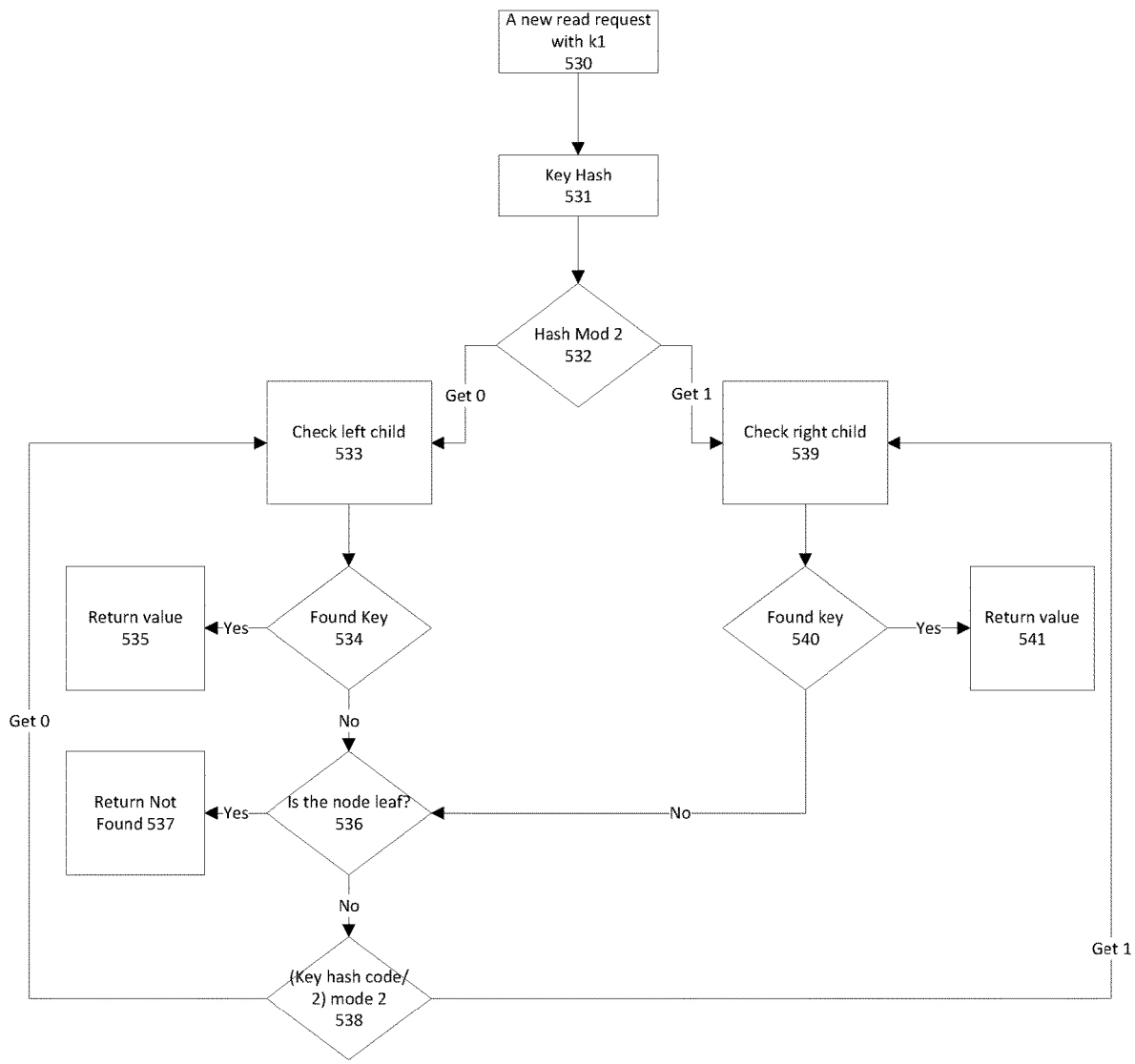
FIG. 5 shows a flowchart for reading a key value pair from a tree structure of nodes, in accordance with an embodiment.

FIG. 5 shows a flowchart for reading a key value pair from a tree structure of nodes, in accordance with an embodiment.

In accordance with an embodiment, FIG. 5 is a flowchart of a method to read a key/value pair from the node keystore tree structure. In accordance with an embodiment, a request can be received with a key, k1 530. After, the system and method can get the key's hash code 531 and mod 2 532. If get 0, the system and method can go left if get 0, and check the left child 533. If the key is found 534, then the value can be returned 535. If the key is not found, the system and method can check if the node is a leaf node 536. If yes, then the system and method can return value not found 537. If the node is not a leaf node (that is, there are more children), the system and method perform (key hash code/2) mod 2 538 again and go to the next level of subtree (get 0 goes to the left tree, get 1 goes to the right tree.) Similarly, if the initial hash mode 2 gets 1, the system and method check the right child 539. If the key is found 540, then the system and method return the value 541. If not, the system and method check whether the node is a leaf node, and if so, returns value not found, and if not, goes to the next lower node.

Figure 6:
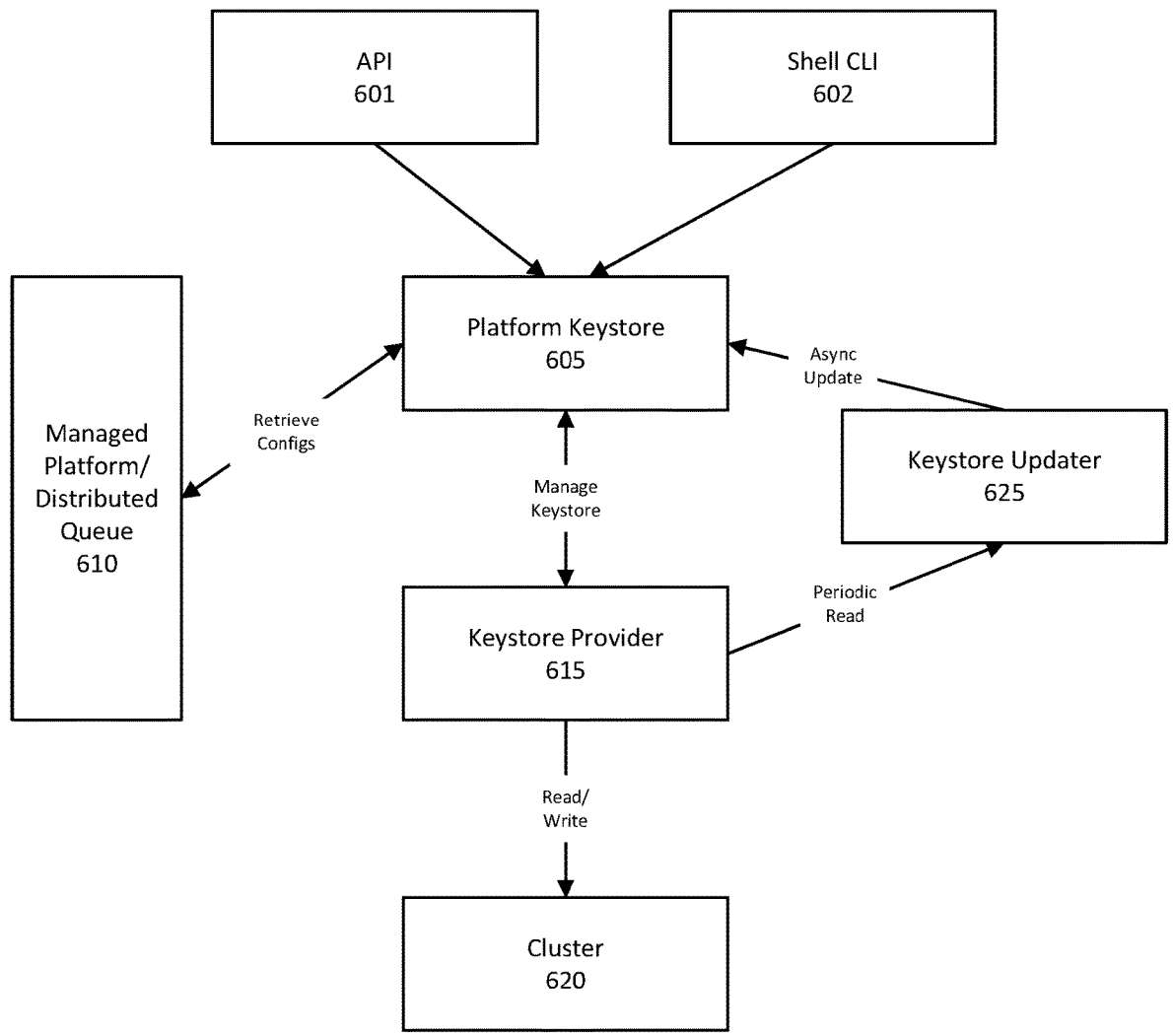
FIG. 6 shows a system for a distributed keystore, in accordance with an embodiment.

FIG. 6 shows a system for a distributed keystore, in accordance with an embodiment.

In accordance with an embodiment, a platform keystore 605 (e.g., Oracle Event Hub Platform Cloud Service (Oehpcs) Java KeyStore) is a component that retrieves necessary cluster information from a given managed platform and distributed queue 610 cluster and creates a keystore services, via a keystore provider 615 that can store the credentials at a cluster 620 (e.g., in a tree structure at the cluster). The platform keystore can additionally utilize the managed platform and distributed queue (e.g., services such as Connect and GMS). Users and clients can access the platform keystore via a number of methods, including but not limited to an API 601 (such as a REST API) or via a shell CLI 602.

In accordance with an embodiment, in order to improve the performance, the systems and methods additionally can support a keystore updater 625 that can automatically and asynchronously updates credentials stored at a memory of the platform keystore. Such updates can occur, for example, when the tree structure at the cluster 620 is updated with a new or updated credential. In this way, a user request does not need to traverse all the way down to the encrypted tree, but instead can access the credentials at the platform keystore.

In accordance with an embodiment, the platform keystore 605 can be built on top of the keystore provider 615 (e.g., ZooKeeper Java KeyStore Provider), which builds and manages the cluster 620 (e.g., ZooKeeper cluster), which can be a tree structure.

In accordance with an embodiment, the platform keystore can provide a number of access points, such as a REST API and a Shell CLI. A managed platform and distributed queue cluster 610 can communicate with and retrieve configurations and credentials from the platform keystore 605.

In accordance with an embodiment, a user can use REST API and/or Shell CLI to pass sensitive information to the platform keystore. Then, the platform keystore 605 can manage the cluster via a keystore provider 615, which can then read/write the credentials into the cluster 620. As well, instead of going through multiple handshakes for HTTP access, a keystore updater 625 can update the memory of the platform keystore on a periodic basis for asynchronous updates of user credentials. Then, the memory within platform keystore can be called on request more efficiently.

Figure 7:
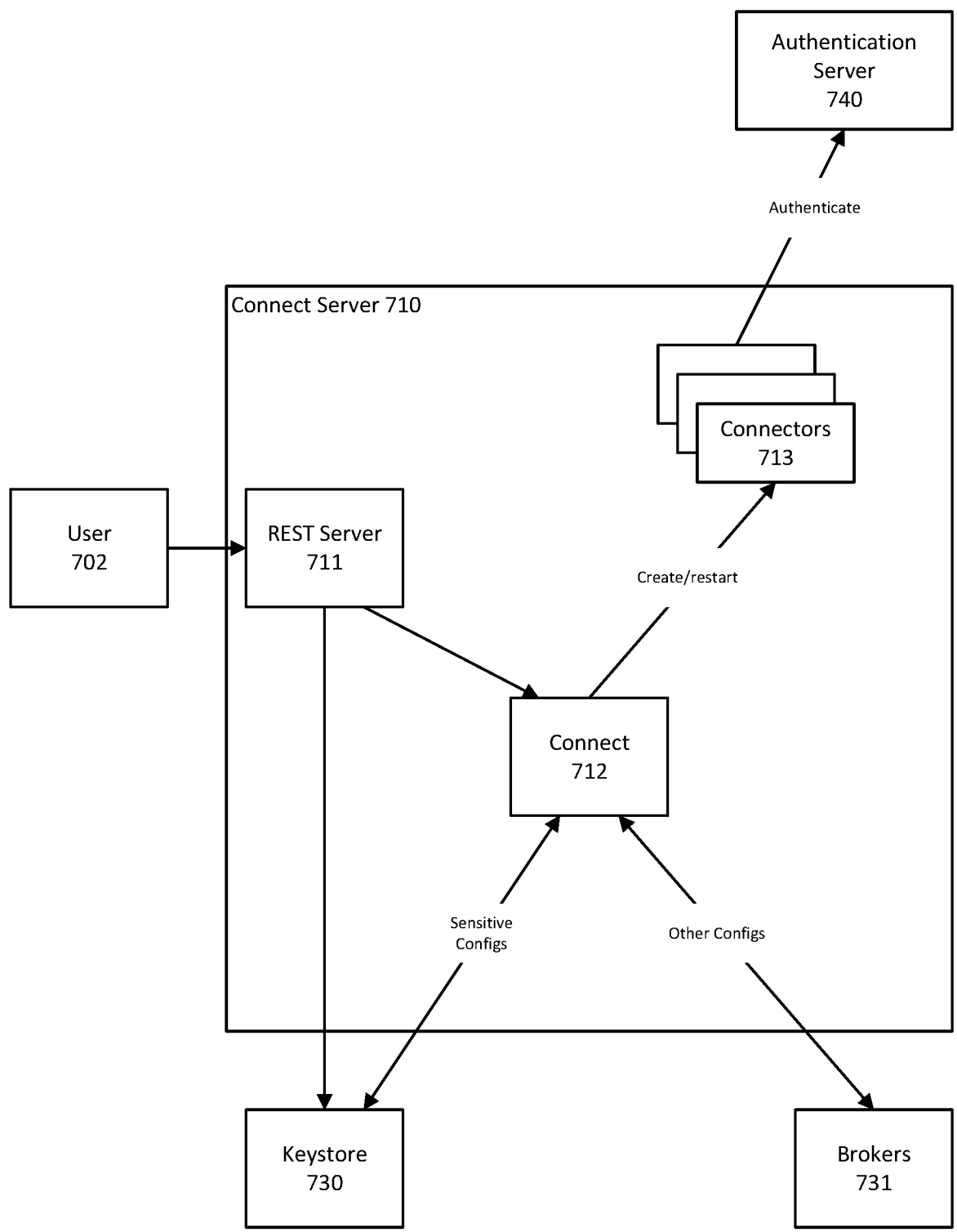
FIG. 7 shows a system for a distributed keystore, in accordance with an embodiment.

FIG. 7 shows a system for a distributed keystore, in accordance with an embodiment.

In accordance with an embodiment, the keystore concepts discussed above can be provided as a connector service. A connector service can provide a bridge that connects various programs and systems that each access a managed platform and distributed queue. However, a challenge faced by a connector service is that the multiple services and systems that it connects can require differing authentication/authorization mechanisms and credentials, even if only one user is involved. To create a connector that can allow for porting data or other information in/out to/from other systems, the systems can be configured to have these authentication/authorization credentials, ACLs, or keys available. The distributed keystore described above provides for such a solution.

In accordance with an embodiment, a user 702 can communicate with a connect server 710 (e.g., Kafka Connect Server) to create one or more connectors 713 (a pipe that allows data to flow from one distributed system to another via connect service). A single user can create and manage server differing types of connectors, such as Cloud Infrastructure connectors, JDBC connectors, and Cloud Storage connectors. Connectors can utilize the encrypted credential information stored at the platform keystore 730 (which is automatically encrypted upon storage), and can also push sensitive credential information to the keystore upon receiving new or updated credentials.

In accordance with an embodiment, as an example, a user wants to move data from a JDBC source to a cloud storage. The user 702 can access the connect service 712 via a REST server 711. Credential information from the REST server can be passed to the platform keystore 730. Upon the call for the connector between a JDBC source and a cloud storage, a JDBC connector 713 to the JDBC source can be created and populated with the user's credential information that is stored at the platform keystore 730. Next, a connector to the cloud storage system can be created. If, for example, this was the first time the user utilized the cloud storage system, the user's inputted credential information for the cloud storage system can be pushed, and encrypted, into the platform keystore 730. In addition, such credential information can be populated into a cloud storage connector 713, which can then connect to the cloud storage system. A connect service can then connect the two created connectors, which would then allow the desired data to be piped from the JDBC source to the cloud storage system while utilizing the user's credentials (both pulled from the platform keystore as well as the new credential information that is pushed to the platform keystore).

In accordance with the above example, the credentials that are populated into both the JDBC connector as well as the cloud storage connector can be validated and authenticated against the each service's respective authentication servers 740. This can also occur for any other credentials for connectors that require authentication from one or more authentication servers.

In accordance with an embodiment, one or more brokers 731, such as Kafka brokers, can be utilized by the connect service, which can be run in one or more Kafka connect servers.

Figure 8:
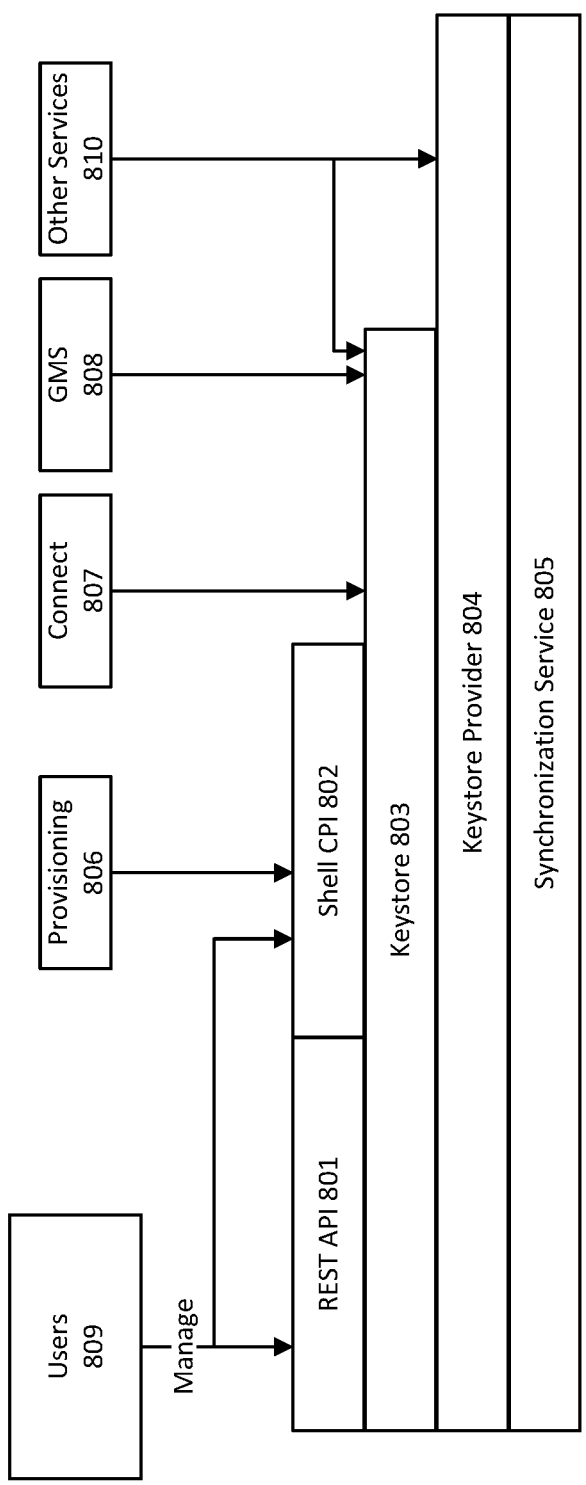
FIG. 8 shows a use case for a distributed keystore, in accordance with an embodiment.

FIG. 8 shows a use case for a distributed keystore, in accordance with an embodiment. More particularly, the use case shown in FIG. 8 is for Oracle Event Hub utilizing a ZooKeeper keystore.

In accordance with an embodiment, as shown in FIG. 8, components 801-804, namely the REST API 801, Shell CLI 802, keystore 803, keystore provider 804 can comprise components of the distributed keystore. Component 805 can comprise a centralized synchronization service 805, such as Zookeeper. Components 806 (Provisioning), 807 (Connect), 808 (GMS—General Messaging System), and other services 810 are examples of products and services that can utilize the distributed keystore.

In accordance with an embodiment, users/administrator 809 can manage the distributed keystore through REST API or shell command line interfaces. Services can be associated with the Oracle Event Hub keystore even if the services are running outside of event hub clusters. The services can additionally use Zookeeper keystore provider to directly manage the distributed keystore.

Figure 9:
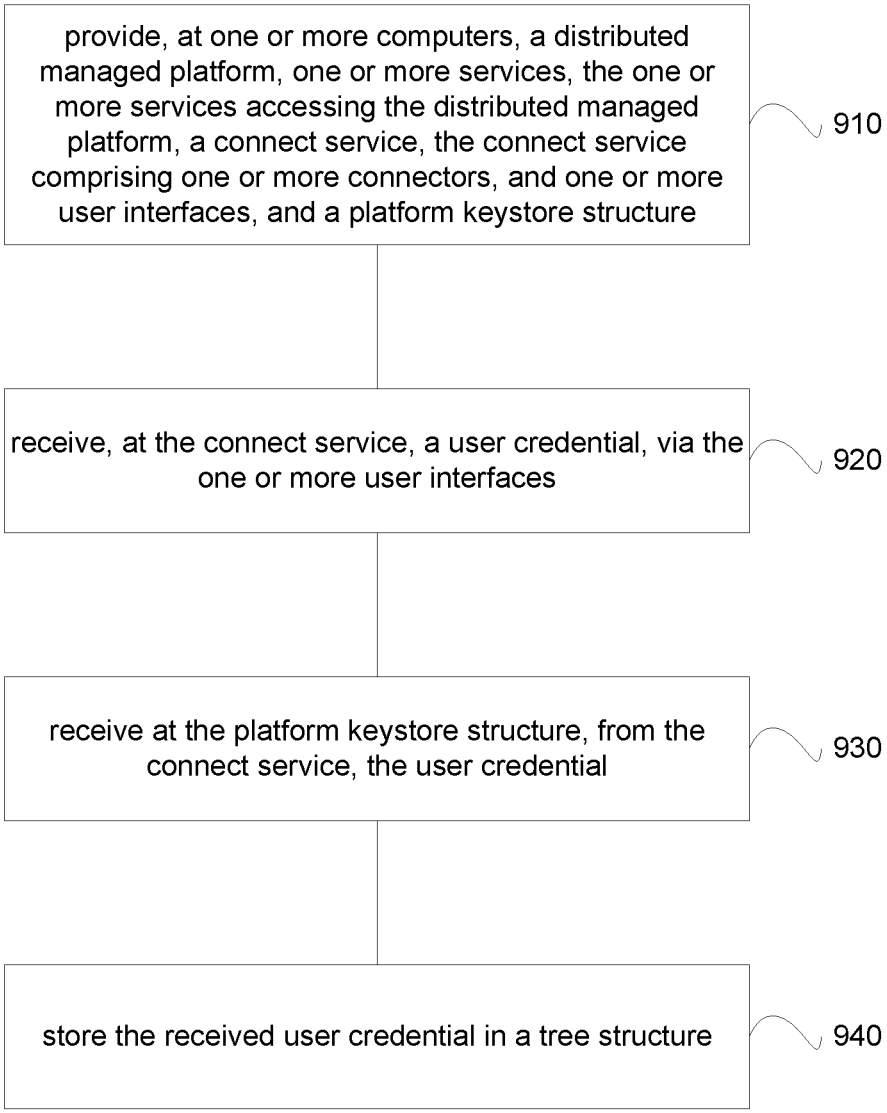
FIG. 9 is a flowchart of a method for supporting a distributed keystore, in accordance with an embodiment.

FIG. 9 is a flowchart of a method for supporting a distributed keystore, in accordance with an embodiment.

At step 910, the method can provide, at one or more computers, a distributed managed platform, one or more services, the one or more services accessing the distributed managed platform, a connect service, the connect service comprising one or more connectors, and one or more user interfaces, and a platform keystore structure.

At step 920, the method can receive, at the connect service, a user credential, via the one or more user interfaces.

At step 930, the method can receive at the platform keystore structure, from the connect service, the user credential.

At step 940, the method can store the received user credential in a tree structure.

While various embodiments of the present invention have been described above, it should be understood that they have been presented by way of example, and not limitation. The embodiments were chosen and described in order to explain the features and principles of the invention and its practical application. The embodiments illustrate systems and methods in which the various features of the present invention are utilized to improve the performance of the systems and methods by providing new and/or improved functions, and/or providing performance advantages including, but not limited to, reduced resource utilization, increased capacity, increased throughput, improved efficiency, reduced latency, enhanced security, and/or improved ease of use.

Some embodiments of the present invention are described herein with reference to flowcharts and/or block diagrams of methods, apparatus (systems), and computer program products which illustrate the architecture, functionality, process, and/or operation. Each block in the flowchart or block diagram represents an element, function, process, module, segment, or portion of instructions, which comprises one or more executable instructions for implementing the specified function. In some alternative embodiments, the functions noted in a block diagram or flowchart, occur out of the order noted in the figures. For example, two blocks shown in succession may be executed substantially concurrently, or in the reverse order, depending upon the functionality involved. Each block of the flowcharts and/or block diagrams, and combinations of blocks in the flowcharts and/or block diagrams, can be implemented by computer program instructions, and/or by special purpose hardware, and/or combinations of hardware and computer program instructions, which perform the specified functions.

In some embodiments, features of the present invention are implemented in a computer including a processor, a computer-readable storage medium, and a network card/interface for communicating with other computers. In some embodiments, features of the present invention are implemented in a network computing environment comprising a computing system including various types of computer configurations, including personal computers, hand-held devices, multi-processor systems, microprocessor-based or programmable consumer electronics, network PCs, mini-computers, mainframe computers, and the like interconnected by a network. The network can be a Local Area Network (LAN), switch fabric network (e.g. InfiniBand), Wide Area Network (WAN), and/or the Internet. The network can include copper transmission cables, optical transmission fibers, wireless transmission, routers, firewalls, switches, gateway computers and/or edge servers.

In some embodiments, features of the present invention are implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the subject matter described herein), or any combination of such back-end, middleware, or front-end components interconnected by a network. The computing system can include clients and servers having a client-server relationship to each other. In some embodiments, features of the invention are implemented in a computing system comprising a distributed computing environment in which one or more clusters of computers are connected by a network. The distributed computing environment can have all computers at a single location or have clusters of computers at different remote geographic locations connected by a network.

In some embodiments, features of the present invention are implemented in the cloud as part of, or as a service of, a cloud computing system based on shared, elastic resources delivered to users in a self-service, metered manner using Web technologies. Characteristics of the cloud may include, for example: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). The cloud generally refers to the combination of hardware, software, network, and web technologies which delivers shared elastic resources to users. The cloud, as used herein, may include public cloud, private cloud, and/or hybrid cloud embodiments, and may include cloud SaaS, cloud DBaaS, cloud PaaS, and/or cloud IaaS deployment models.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention are implemented by circuitry that is specific to a given function. In other implementations, features are implemented in a computer, computing system, processor, and/or network, configured to perform particular functions using instructions stored e.g. on a computer-readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure.

In some embodiments, the present invention includes a computer program product which is a machine-readable or computer-readable storage medium (media) having instructions comprising software and/or firmware stored thereon/in, which instructions can be used to program or otherwise configure a system such as a computer to perform any of the processes or functions of the present invention. The storage medium or computer readable medium can include any type of media or device suitable for storing instructions and/or data including, but not limited to, floppy disks, hard drives, solid state drives, optical discs, DVD, CD-ROMs, microdrives, and magneto-optical disks, ROMs, RAMs, EPROMs, EEPROMs, DRAMs, VRAMs, flash memory devices, magnetic or optical cards, molecular memories, nanosystems, or variations and combinations thereof. In particular embodiments, the storage medium or computer readable medium is a non-transitory machine-readable storage medium or non-transitory computer-readable storage medium.

The foregoing description is not intended to be exhaustive or to limit the invention to the precise forms disclosed. Additionally, where embodiments of the present invention have been described using a particular series of transactions and steps, it should be apparent to those skilled in the art that, unless stated, the embodiment does not exclude performance of additional transactions and steps. Further, while the various embodiments describe particular combinations of features of the invention it should be understood that different combinations of the features will be apparent to persons skilled in the relevant art as within the scope of the invention. In particular, a feature (device-like or method-like) recited in a given embodiment, variant, or shown in a drawing may be combined with or replace another feature in another embodiment, variant or drawing, without departing from the scope of the present invention. Moreover, it will be apparent to persons skilled in the relevant art that various additions, subtractions, deletions, variations, substitutions of elements with equivalents, and other modifications and changes in form, detail, implementation and application can be made therein without departing from the spirit and scope of the invention. It is intended that the broader spirit and scope of the invention be defined by the following claims and their equivalents.

What is claimed is:

1. A system for supporting a distributed keystore comprising:
a computer comprising a microprocessor;
a distributed managed platform provided at the computer;
one or more services provided at the computer, the one or more services accessing the distributed managed platform;
a connect service provided at the computer, the connect service comprising one or more connectors, and one or more user interfaces; and
a platform keystore structure provided at the computer;
wherein the connect service receives a user credential, via the one or more user interfaces, the user credential being associated with a tenant of a plurality of tenants;
wherein the platform keystore structure receives, from the connect service, the user credential;
wherein the received user credential is stored in a tree structure;
wherein the tree structure comprises a plurality of nodes distributed at two or more levels of the tree structure;
wherein a first level of the two or more levels of the tree structure comprises a root node of the plurality of nodes, the root node comprising metadata comprising a mapping of the tree structure and a mapping of the plurality of tenants to the plurality of nodes; and
wherein the received user credential is stored at a level other than the first level of the two or more levels.

2. The system of claim 1, further comprising:
a keystore provider, wherein the keystore provider creates the tree structure and encrypts the user credential before the user credential is stored in the tree structure.

3. The system of claim 2,
wherein the received user credential is stored at a first node of the plurality of nodes of a second level of the two more levels of the tree structure.

4. The system of claim 3,
wherein each of the plurality of nodes have a size limitation of approximately one megabyte.

5. The system of claim 4,
wherein upon the first node of the plurality of nodes at the second level of the two or more levels of the tree structure being full prior to storing the user credential, the keystore provider creates a new node for storing the received user credential; and
wherein metadata mapping information associated with the new node is added to the metadata at the root node.

6. A method for supporting a distributed keystore comprising:
providing, at one or more computers,
a distributed managed platform,
one or more services, the one or more services accessing the distributed managed platform,
a connect service, the connect service comprising one or more connectors, and one or more user interfaces, and
a platform keystore structure;
receiving, at the connect service, a user credential, via the one or more user interfaces, the user credential being associated with a tenant of a plurality of tenants;
receiving, at the platform keystore structure, from the connect service, the user credential; and
storing the received user credential in a tree structure;
wherein the tree structure comprises a plurality of nodes distributed at two or more levels of the tree structure;
wherein a first level of the two or more levels of the tree structure comprises a root node of the plurality of nodes, the root node comprising metadata comprising a mapping of the tree structure and a mapping of the plurality of tenants to the plurality of nodes; and
wherein the received user credential is stored at a level other than the first level of the two or more levels.

7. The method of claim 6, further comprising:

further providing, at the one or more computers, a keystore provider;

creating, by the keystore provider, the tree structure;

encrypting the user credential before the user credential is stored in the tree structure.

8. The method of claim 7, further comprising:

storing the received user credential at a first node of the plurality of nodes of a second level of the two more levels of the tree structure.

9. The method of claim 8, wherein each of the plurality of nodes have a size limitation of approximately one megabyte.

10. The method of claim 9, further comprising:

upon the first node of the plurality of nodes at the second level of the two or more levels of the tree structure being full prior to storing the user credential, creating, by the keystore provider, a new node for storing the received user credential; and adding metadata mapping information associated with the new node to the metadata at the root node.

11. A non-transitory computer readable storage medium having instructions thereon for supporting a distributed keystore, which when read and executed cause one or more computers to perform steps comprising:

providing, at the one or more computers, a distributed managed platform, one or more services, the one or more services accessing the distributed managed platform, a connect service, the connect service comprising one or more connectors, and one or more user interfaces, and a platform keystore structure;

receiving, at the connect service, a user credential, via the one or more user interfaces, the user credential being associated with a tenant of a plurality of tenants;

receiving, at the platform keystore structure, from the connect service, the user credential; and storing the received user credential in a tree structure;

wherein the tree structure comprises a plurality of nodes distributed at two or more levels of the tree structure;

wherein a first level of the two or more levels of the tree structure comprises a root node of the plurality of nodes, the root node comprising metadata comprising a mapping of the tree structure and a mapping of the plurality of tenants to the plurality of nodes; and wherein the received user credential is stored at a level other than the first level of the two or more levels.

12. The non-transitory computer readable storage medium of claim 11, the steps further comprising:

further providing, at the one or more computers, a keystore provider;

creating, by the keystore provider, the tree structure;

encrypting the user credential before the user credential is stored in the tree structure.

13. The non-transitory computer readable storage medium of claim 12, the steps further comprising:

storing the received user credential at a first node of the plurality of nodes of a second level of the two more levels of the tree structure;

wherein each of the plurality of nodes have a size limitation of approximately one megabyte.

14. The non-transitory computer readable storage medium of claim 13, the steps further comprising:

upon the first node of the plurality of nodes at the second level of the two or more levels of the tree structure being full prior to storing the user credential, creating, by the keystore provider, a new node for storing the received user credential; and adding metadata mapping information associated with the new node to the metadata at the root node.

* * * * *